US012352845B1

United States Patent
Yan et al.

(10) Patent No.: US 12,352,845 B1
(45) Date of Patent: Jul. 8, 2025

(54) PIT-BASED FISH SCHOOL TRAJECTORY MONITORING METHOD AND SYSTEM FOR MARINE RANCH

(71) Applicant: Guangdong Ocean University, Zhanjiang (CN)

(72) Inventors: Yunrong Yan, Zhanjiang (CN); Zhao Li, Zhanjiang (CN); Feng Wang, Zhanjiang (CN); Qing Feng, Zhanjiang (CN); Jianan Zheng, Zhanjiang (CN); Zhenyu Jiang, Zhanjiang (CN); Qi Lin, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/082,845

(22) Filed: Mar. 18, 2025

(30) Foreign Application Priority Data

Oct. 17, 2024 (CN) .......................... 202411449241.4

(51) Int. Cl.
*G01S 13/75* (2006.01)
*G06N 20/00* (2019.01)

(52) U.S. Cl.
CPC .............. *G01S 13/75* (2013.01); *G06N 20/00* (2019.01)

(58) Field of Classification Search
None
See application file for complete search history.

(56) References Cited

U.S. PATENT DOCUMENTS

| 2008/0152192 A1* | 6/2008 | Zhu ....................... G06V 10/147 |
| | | 382/103 |
| 2023/0102365 A1* | 3/2023 | Quan ...................... G06F 30/28 |
| | | 119/269 |
| 2024/0276992 A1* | 8/2024 | Khawaja ................ A22B 5/007 |

OTHER PUBLICATIONS

Francisco, Fritz A., Paul Nührenberg, and Alex Jordan. "High-resolution, non-invasive animal tracking and reconstruction of local environment in aquatic ecosystems." Movement ecology 8 (2020): 1-12. (Year: 2020).*

Wang, Shuo Hong, et al. "3D tracking swimming fish school with learned kinematic model using LSTM network." 2017 IEEE international conference on acoustics, speech and signal processing (ICASSP). IEEE, 2017. (Year: 2017).*

(Continued)

*Primary Examiner* — Raymond L Nimox
(74) *Attorney, Agent, or Firm* — Hemisphere Law, PLLC; Zhigang Ma (57) ABSTRACT

A passive integrated transponder (PIT)-based fish school trajectory monitoring method and system for a marine ranch are provided. The method includes: using a PIT reader to obtain PIT tag information of each fish of a target fish school during a monitoring period; generating a three-dimensional (3D) fish school trajectory map of the target fish school; generating a motion sequence of each fish, inputting the motion sequence of each fish into a motion trajectory correction model, and outputting a corrected motion sequence of each fish; generating a first corrected 3D fish school trajectory map of the target fish school during the monitoring period, and generating a second corrected 3D fish school trajectory map; and generating motion information of the target fish school, and feeding back the second corrected 3D fish school trajectory map and the motion information of the target fish school to monitoring personnel.

8 Claims, 2 Drawing Sheets

(56) References Cited

OTHER PUBLICATIONS

Zhang, Lanyue, et al. "Fish target detection and speed estimation method based on computer vision." 2023 IEEE 6th International Conference on Electronic Information and Communication Technology (ICEICT). IEEE, 2023. (Year: 2023).*

China Institute of Electronic Product Reliability and Environmental Testing (Applicant), Replacement claims (allowed) of CN202411449241.4, Nov. 20, 2024.

CNIPA, Notification to grant patent right for invention in CN202411449241.4, Dec. 23, 2024.

* cited by examiner

```
┌─────────────────────────────────────────────────────────────┐
│   using a PIT reader to obtain PIT tag information of each fish of a target fish      │── S1
│  school during a monitoring period to thereby obtain PIT tag information of the       │
│                 target fish school during the monitoring period                        │
└─────────────────────────────────────────────────────────────┘
                                    │
                                    ▼
┌─────────────────────────────────────────────────────────────┐
│     generating, according to the PIT tag information of the target fish school        │── S2
│     during the monitoring period, a three-dimensional (3D) fish school trajectory     │
│              map of the target fish school during the monitoring period               │
└─────────────────────────────────────────────────────────────┘
                                    │
                                    ▼
┌─────────────────────────────────────────────────────────────┐
│ generating, according to the 3D motion trajectory of each fish of the target fish     │
│  school, a motion sequence of each fish of the target fish school, inputting the      │── S3
│   motion sequence of each fish of the target fish school into a motion trajectory     │
│   correction model, and outputting, by the motion trajectory correction model, a      │
│     corrected motion sequence of each fish of the target fish school to thereby       │
│             obtain corrected motion sequences of all fish of the target fish school   │
└─────────────────────────────────────────────────────────────┘
                                    │
                                    ▼
┌─────────────────────────────────────────────────────────────┐
│     generating, according to the corrected motion sequences of all fish of the        │
│    target fish school, a first corrected 3D fish school trajectory map of the target  │── S4
│     fish school during the monitoring period, and generating a second corrected       │
│      3D fish school trajectory map according to the first corrected 3D fish school    │
│                  trajectory map and the 3D fish school trajectory map                  │
└─────────────────────────────────────────────────────────────┘
                                    │
                                    ▼
┌─────────────────────────────────────────────────────────────┐
│       generating motion information of the target fish school according to the        │── S5
│    second corrected 3D fish school trajectory map, and feeding back the second        │
│       corrected 3D fish school trajectory map and the motion information of the       │
│                     target fish school to monitoring personnel                         │
└─────────────────────────────────────────────────────────────┘
```

PIT-BASED FISH SCHOOL TRAJECTORY MONITORING METHOD AND SYSTEM FOR MARINE RANCH

CROSS-REFERENCE TO RELATED APPLICATION

This application claims priority to Chinese patent application No. CN 202411449241.4, filed to China National Intellectual Property Administration (CNIPA) on Oct. 17, 2024, which is herein incorporated by reference in its entirety.

TECHNICAL FIELD

The present disclosure relates to the technical field of fish school trajectory monitoring, and particularly to a passive integrated transponder (PIT)-based fish school trajectory monitoring method and system for a marine ranch.

BACKGROUND

Fish school monitoring in a marine ranch is an important means to ensure the sustainable utilization of marine fishery resources and improve aquaculture efficiency. The fish school monitoring in the marine ranch mainly includes monitoring a quantity and density of a fish school, monitoring the behavior of the fish school, monitoring a growth state of the fish school and monitoring a trajectory of the fish school. In the aspect of monitoring the trajectory of the fish school, a migration law and ecological habits of the fish school are studied mainly by tracking a moving trajectory of the fish school, thus providing guidance for the protection and utilization of fishery resources. Current fish school trajectory monitoring methods for a marine ranch mainly uses a satellite remote sensing technology, which involves using a remote sensor mounted on a satellite to conduct regular or continuous observations of the marine ranch. Information of the fish school is extracted through image processing and analysis techniques. However, the satellite remote sensing technology is affected by weather factors such as cloud cover and sea fog during image acquisition, thereby leading to issues with image clarity. Moreover, the satellite remote sensing technology struggles to identify small fish school or an individual fish, thereby resulting in the omission of data of the small fish school or the individual fish during monitoring. This significantly compromises the accuracy of the satellite remote sensing technology when applied to the monitoring of the trajectory of the fish school.

SUMMARY

Embodiments of the present disclosure provides a PIT-based fish school trajectory monitoring method and system for a marine ranch, which can solve the problems that the accuracy of fish school monitoring is lower and individual monitoring in the fish school cannot be realized due to the existing analysis of the trajectory of the fish school by shooting a motion image of the fish school by satellite remote sensing technology, improve the accuracy of monitoring the motion trajectory of a target fish school in the marine ranch, and provide more accurate and rich data support for a monitoring personnel to study the biology of the target fish school.

In one aspect, an embodiment of the present disclosure provides a PIT-based fish school trajectory monitoring method for a marine ranch, which includes:

using a PIT reader to obtain PIT tag information of each fish of a target fish school during a monitoring period to thereby obtain PIT tag information of the target fish school during the monitoring period, where each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school includes: a PIT tag, a time stamp, a first longitude coordinate, a first latitude coordinate and a first vertical depth;

generating, according to the PIT tag information of the target fish school during the monitoring period, a three-dimensional (3D) fish school trajectory map of the target fish school during the monitoring period, where the 3D fish school trajectory map consists of 3D motion trajectories of all fish in the target fish school, a 3D motion trajectory of each fish of the target fish school includes multiple 3D spatial points, a 3D coordinate of each of the multiple 3D spatial points includes: a second longitude coordinate, a second latitude coordinate, and a second vertical depth;

generating, according to the 3D motion trajectory of each fish of the target fish school, a motion sequence of each fish of the target fish school, inputting the motion sequence of each fish of the target fish school into a motion trajectory correction model, and outputting, by the motion trajectory correction model, a corrected motion sequence of each fish of the target fish school to thereby obtain corrected motion sequences of all fish of the target fish school;

generating, according to the corrected motion sequences of all fish of the target fish school, a first corrected 3D fish school trajectory map of the target fish school during the monitoring period, and generating a second corrected 3D fish school trajectory map according to the first corrected 3D fish school trajectory map and the 3D fish school trajectory map; and generating motion information of the target fish school according to the second corrected 3D fish school trajectory map, and feeding back the second corrected 3D fish school trajectory map and the motion information of the target fish school to a monitoring personnel, where the motion information of the target fish school includes: a migration direction of the target fish school, and a movement speed of the target fish school during the monitoring period.

In an embodiment, the PIT-based fish school trajectory monitoring method for the marine ranch further includes: sending the second corrected 3D fish school trajectory map, the migration direction of the target fish school, and the movement speed of the target fish school during the monitoring period to a controller of a fishing device, the fishing device including the controller, a fishing net, and an actuator connected to the controller and the fishing net; and controlling by the controller, based on the second corrected 3D fish school trajectory map, the migration direction of the target fish school, and the movement speed of the target fish school during the monitoring period, the actuator to drive the fishing net to reach a target position to catch the target fish school.

In an embodiment, a construction process of the motion trajectory correction model includes:

obtaining historical motion sequence samples of multiple fish species, where each sample of the historical motion sequence samples includes multiple historical 3D coordinate samples with continuous time stamps;

constructing an initial motion trajectory correction model, where the initial motion trajectory correction model includes a classification module and a trajectory correction module, the trajectory correction module includes trajectory correction sub-models, each of the trajectory correction sub-models corresponds to one fish species of the multiple fish species;

training the classification module of the initial motion trajectory correction model with the historical motion sequence samples of the multiple fish species until the classification module reaches a first preset convergence condition, obtaining network parameters of the classification module in the first preset convergence condition, and freezing the network parameters of the classification module to obtain frozen network parameters of the classification module;

training each of the trajectory correction sub-models with the historical motion sequence samples of the one fish species of the multiple fish species corresponding to each of the trajectory correction sub-models until the trajectory correction sub-model reaches a second preset convergence condition, obtaining network parameters of each of the trajectory correction sub-models in the second preset convergence condition, and freezing the network parameters of each of the trajectory correction sub-models to obtain frozen network parameters of each of the trajectory correction sub-models; and adjusting network parameters of the initial motion trajectory correction model according to the frozen network parameters of the classification module and the frozen network parameters of each of the trajectory correction sub-models, and generating the motion trajectory correction model.

In an embodiment, the training each of the trajectory correction sub-models with the historical motion sequence samples of the one fish species of the multiple fish species corresponding to each of the trajectory correction sub-models includes:

dividing, according to a time stamp sequence of the historical motion sequence samples, the historical motion sequence samples into multiple motion sequence sample fragments, where each of the multiple motion sequence sample fragments includes motion samples under three consecutive time stamps; and training each of the trajectory correction sub-models with the multiple motion sequence sample fragments, including: when the trajectory correction sub-model is trained with one motion sequence sample fragment of the multiple motion sequence sample fragments, repeatedly performing an operation of selecting a motion sample under one time stamp of the three consecutive time stamps as an output and selecting the motion samples under the remaining time stamps of the three consecutive time stamps as inputs to train the trajectory correction sub-model until all motion samples at each time stamp within the one motion sequence sample fragment have been selected as outputs, and then training the trajectory correction sub-model with a next motion sequence sample fragment of the multiple motion sequence sample fragments to the one motion sequence sample fragment.

In an embodiment, the generating, according to the PIT tag information of the target fish school during the monitoring period, a 3D fish school trajectory map of the target fish school during the monitoring period includes:

classifying the PIT tag information of the target fish school according to the PIT tag of the PIT tag information of each fish of the target fish school, to obtain PIT tag information groups of all fish of the target fish school;

generating a 3D motion trajectory corresponding to each of the PIT tag information groups according the time stamp, the first longitude coordinate, the first latitude coordinate, and the first vertical depth, to thereby obtain 3D motion trajectories corresponding to the PIT tag information groups;

dividing, according to the PIT tag of the PIT tag information of each fish of the target fish school, the target fish school into fish species, and obtaining 3D motion trajectories of the fish species of the target fish school;

fitting the 3D motion trajectories of the fish species of the target fish school to generate fitted 3D motion trajectories of the fish species of the target fish school; and generating, according to the fitted 3D motion trajectories of the fish species of the target fish school and the 3D motion trajectories corresponding to the PIT tag information groups, the 3D fish school trajectory map of the target fish school during the monitoring period.

In an embodiment, the generating, according to the 3D motion trajectory of each fish of the target fish school, a motion sequence of each fish of the target fish school includes:

selecting 3D spatial points from the 3D motion trajectory of each fish of the target fish school to generate a 3D spatial point set, and recording a time stamp of each of the selected 3D spatial points, where the 3D spatial point set includes at least the multiple 3D spatial points generated by the PIT tag information, a starting point of the 3D motion trajectory and an ending point of the 3D motion trajectory; and generating the motion sequence according to the 3D spatial point set and a time stamp of each 3D spatial point in the 3D spatial point set.

In an embodiment, the generating, according to the corrected motion sequences of all fish of the target fish school, a first corrected 3D fish school trajectory map of the target fish school during the monitoring period, and generating a second corrected 3D fish school trajectory map according to the first corrected 3D fish school trajectory map and the 3D fish school trajectory map includes:

generating, according to the corrected motion sequence of each fish of the target fish school, a corrected 3D motion trajectory of each fish of the target fish school to thereby obtain corrected 3D motion trajectories of all fish of the target fish school;

fitting corrected 3D motion trajectories belonging to a same fish species of the corrected 3D trajectories of all fish of the target fish school according to the PIT tag of each fish of the target fish school to obtain fitted corrected 3D motion trajectories of the fish species of the target fish school;

generating, according to the fitted corrected 3D motion trajectories of the fish species of the target fish school and the corrected 3D motion trajectories of all fish of the target fish school, the first corrected 3D fish school trajectory map;

constructing, according to the first corrected 3D fish school trajectory map, a geometric spatial body corresponding to a movement area of the target fish school during the monitoring period;

establishing a spatial cartesian coordinate system by taking a geometric center of the geometric spatial body as a coordinate origin, converting each 3D spatial point in the first corrected 3D fish school trajectory map into a 3D coordinate corresponding to the spatial cartesian coordinate system to thereby generate a third corrected 3D fish school trajectory map;

projecting the third corrected 3D fish school trajectory map onto the spatial cartesian coordinate system to obtain a first projection of the third corrected 3D fish school trajectory map on a horizontal plane in the spatial cartesian coordinate system, a second projection of the third corrected 3D fish school trajectory map on a vertical plane in the spatial cartesian coordinate system, and a third projection of the third corrected 3D fish school trajectory map on a lateral plane in the spatial cartesian coordinate system;

converting each 3D spatial point in the 3D fish school trajectory map into a 3D coordinate corresponding to the spatial cartesian coordinate system to thereby generate a to-be-corrected 3D fish school trajectory map;

projecting the to-be-corrected 3D fish school trajectory map onto the spatial cartesian coordinate system to obtain a fourth projection of the to-be-corrected 3D fish school trajectory map on the horizontal plane in the spatial cartesian coordinate system, a fifth projection of the to-be-corrected 3D fish school trajectory map on the vertical plane in the spatial cartesian coordinate system, and a sixth projection of the to-be-corrected 3D fish school trajectory map on the lateral plane in the spatial cartesian coordinate system; and correcting the fourth projection according to the first projection, correcting the fifth projection according to the second projection, and correcting the sixth projection according to the third projection, to thereby generate the second corrected 3D fish school trajectory map.

In an embodiment, after the constructing, according to the first corrected 3D fish school trajectory map, a geometric spatial body corresponding to a movement area of the target fish school during the monitoring period, the PIT-based fish school trajectory monitoring method for the marine ranch further includes:

obtaining coordinate information of a marine ecological red line, and determining a two-dimensional (2D) section model of the marine ecological red line according to the coordinate information of the marine ecological red line;

in response to the geometric space corresponding to the movement area of the target fish school during the monitoring period being interspersed with the 2D section model of the marine ecological red line, determining time stamps corresponding to corrected 3D fish school trajectory map segments within the marine ecological red line;

obtaining 3D fish school trajectory map segments according to time stamps corresponding to corrected 3D fish school trajectory map segments within the marine ecological red line, obtaining 3D coordinates of 3D spatial points in the 3D fish school trajectory map segments, and converting the 3D coordinates of 3D spatial points in the 3D fish school trajectory map segments into 3D coordinates corresponding to the spatial cartesian coordinate system to thereby generate a fourth corrected 3D fish school trajectory map; and projecting the fourth corrected 3D fish school trajectory map onto the spatial cartesian coordinate system to obtain a seventh projection of the fourth corrected 3D fish school trajectory map on the horizontal plane in the spatial cartesian coordinate system, an eighth projection of the fourth corrected 3D fish school trajectory map on the vertical plane in the spatial cartesian coordinate system, and a ninth projection of the fourth corrected 3D fish school trajectory map on the lateral plane in the spatial cartesian coordinate system;

where the correcting the fourth projection according to the first projection, correcting the fifth projection according to the second projection, and correcting the sixth projection according to the third projection, to thereby generate the second corrected 3D fish school trajectory map includes:

correcting the fourth projection according to the first projection and the seventh projection, correcting the fifth projection according to the second projection and the eighth projection, and correcting the sixth projection according to the third projection and the ninth projection, to thereby generate the second corrected 3D fish school trajectory map.

On the basis of the above method embodiments, the present disclosure correspondingly provides system embodiments.

An embodiment of the present disclosure provides PIT-based fish school trajectory monitoring system for a marine ranch, which includes a data obtaining module, a 3D trajectory map generation module, a trajectory correction module, and a monitoring information feedback module;

the data obtaining module is configured to: use a PIT reader to obtain PIT tag information of each fish of a target fish school during a monitoring period to thereby obtain PIT tag information of the target fish school during the monitoring period, where each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school includes: a PIT tag, a time stamp, a first longitude coordinate, a first latitude coordinate and a first vertical depth;

the 3D trajectory map generation module is configured to: generate, according to the PIT tag information of the target fish school during the monitoring period, a 3D fish school trajectory map of the target fish school during the monitoring period, where the 3D fish school trajectory map consists of 3D motion trajectories of all fish in the target fish school, a 3D motion trajectory of each fish of the target fish school includes multiple 3D spatial points, a 3D coordinate of each of the multiple 3D spatial points includes: a second longitude coordinate, a second latitude coordinate, and a second vertical depth;

the trajectory correction module is configured to: generate, according to the 3D motion trajectory of each fish of the target fish school, a motion sequence of each fish of the target fish school, input the motion sequence of each fish of the target fish school into a motion trajectory correction model, output, by the motion trajectory correction model, a corrected motion sequence of each fish of the target fish school to thereby obtain corrected motion sequences of all fish of the target fish school, generate, according to the corrected motion sequences of all fish of the target fish school, a first corrected 3D fish school trajectory map of the target fish school during the monitoring period, and generate a second corrected 3D fish school trajectory map according to the first corrected 3D fish school trajectory map and the 3D fish school trajectory map; and the monitoring information feedback module is configured to: generate motion information of the target fish school according to the second corrected 3D fish school trajectory map, and feedback the second corrected 3D fish school trajectory map and the motion information of the target fish school to a monitoring personnel, where the motion information of the target fish school includes: a migration direction of the target fish school, and a movement speed of the target fish school during the monitoring period.

Another embodiment of the present disclosure provides a terminal device, which includes a processor, a memory and a computer program stored in the memory. The computer program, when executed by the processor, is configured to implement the PIT-based fish school trajectory monitoring method for the marine ranch described above.

Another embodiment of the present disclosure provides a storage medium, which includes a computer program stored in the storage medium. The computer program, when executed by a device on which the storage medium is located, is configured to control the device to implement the PIT-based fish school trajectory monitoring method for the marine ranch described above.

The present disclosure has at least the following beneficial effects.

The present disclosure provides a PIT-based fish school trajectory monitoring method and system for a marine ranch. In the method, a PIT is implanted in each fish of a target fish school, and then the PIT tag information of each fish of the target fish school in a monitoring period is obtained by a PIT reader. The PIT tag information includes a PIT tag, a time stamp, a first longitude coordinate, a first latitude coordinate and a first vertical depth. A 3D fish school trajectory map of the target fish school during the monitoring period is generated according to the PIT tag information of the target fish school during the monitoring period. By implanting the PIT, each fish in the target fish school can be monitored, that is, the individual monitoring of the target fish school can be realized, which can solve the problems that the accuracy of fish school monitoring is lower and individual monitoring in the fish school cannot be realized due to the existing analysis of the trajectory of the fish school by shooting a motion image of the fish school by satellite remote sensing technology, and improve the accuracy of monitoring the motion trajectory of a target fish school in the marine ranch. Furthermore, after the trajectory correction model is used to correct the 3D motion trajectory generated by using the PIT tag information, the 3D fish school trajectory map generated by using the PIT tag information can be corrected, thus further improving the accuracy of the motion information of the target fish provided by the corrected 3D fish school trajectory map during the monitoring period, and providing more accurate and rich data support for a monitoring personnel to study the biological characteristics of the target fish school.

BRIEF DESCRIPTION OF DRAWINGS

FIG. 1 illustrates a schematic flow chart of a PIT-based fish school trajectory monitoring method for a marine ranch.

DETAILED DESCRIPTION OF EMBODIMENTS

In the following, the technical solutions in the embodiments of the present disclosure will be clearly and completely described with reference to accompanying drawings. Apparently, the described embodiments are only part of embodiments of the present disclosure, but not the whole embodiments. Based on the described embodiments in the present disclosure, all other embodiments obtained by ordinary technicians in the field without creative work belong to the scope of protection of the present disclosure.

In order to better understand the technical solutions of the present disclosure, it needs to be explained in advance that the PIT is a miniature electronic tag developed based on radio frequency identification system, which is smaller in size and can be implanted into animals by injection. Each PIT has a built-in unique identification code, which gives each animal a unique identification number. The PIT can realize wireless and non-contact identification.

As illustrated in FIG. 1, a PIT-based fish school trajectory monitoring method for a marine ranch provided by an embodiment of the present disclosure includes steps S1 through S5.

In the step S1, a PIT reader is used to obtain PIT tag information of each fish of a target fish school during a monitoring period to thereby obtain PIT tag information of the target fish school during the monitoring period. Each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school includes: a PIT tag, a time stamp, a first longitude coordinate, a first latitude coordinate and a first vertical depth.

In the step S2, according to the PIT tag information of the target fish school during the monitoring period, a three-dimensional (3D) fish school trajectory map of the target fish school during the monitoring period is generated. The 3D fish school trajectory map consists of 3D motion trajectories of all fish in the target fish school, a 3D motion trajectory of each fish of the target fish school includes multiple 3D spatial points, and a 3D coordinate of each of the multiple 3D spatial points includes: a second longitude coordinate, a second latitude coordinate, and a second vertical depth.

In the step S3, a motion sequence of each fish of the target fish school is generated according to the 3D motion trajectory of each fish of the target fish school, the motion sequence of each fish of the target fish school is inputted into a motion trajectory correction model, and a corrected motion sequence of each fish of the target fish school is outputted by the motion trajectory correction model, to thereby obtain corrected motion sequences of all fish of the target fish school.

In the step S4, a first corrected 3D fish school trajectory map of the target fish school during the monitoring period is generated according to the corrected motion sequences of all fish of the target fish school, and a second corrected 3D fish school trajectory map is generated according to the first corrected 3D fish school trajectory map and the 3D fish school trajectory map.

In the step S5, motion information of the target fish school is generated according to the second corrected 3D fish school trajectory map, and the second corrected 3D fish school trajectory map and the motion information of the target fish school is fed back to monitoring personnel. The motion information of the target fish school includes: a migration direction of the target fish school, and a movement speed of the target fish school during the monitoring period.

Specifically, in the step S1, each fish in the target fish school to be monitored in the marine ranch is implanted with a unique PIT by an injection manner before monitoring, and identity information of each fish, such as release time, birth information and fish species information, is bound by a PIT tag in the PIT. The target fish school injected with PITs is put into the marine ranch, and PIT tag information of the target fish is obtained based on PIT readers during the monitoring period. The PIT readers are usually arranged in the marine ranch at certain intervals, and the PIT carried by each fish in the marine ranch is activated by radio frequency signals emitted by the PIT readers. When the fish implanted with the PIT passes through a signal range of a corresponding PIT reader, the corresponding PIT reader recognizes the PIT tag of this fish and generates the PIT tag information corresponding to the PIT tag. The PIT tag information includes a PIT tag, a time stamp corresponding to recording time, a longitude coordinate (i.e. the above-mentioned first longitude coordinate) of the PIT reader for recording, a latitude coordinate (i.e. the above-mentioned first latitude coordinate) of the PIT reader for recording and a vertical depth (i.e. the above-mentioned first vertical depth) of the PIT reader for recording from a seawater level of the marine ranch. In this way, the PITs are injected into all fish individuals of the target fish school, and then the PIT tag information of each fish individual is obtained through the PIT reader, so that the individual monitoring of the target fish school can be realized, and the problems that the accuracy of fish school monitoring is lower and individual monitoring in the fish school cannot be realized due to the existing analysis of the trajectory of the fish school by shooting a motion image of the fish school by satellite remote sensing technology can be solved.

However, because specific position information of the fish implanted with the PIT in the marine ranch cannot be directly obtained, the obtained position information is actually the position information of the PIT reader the fish passes through, therefore, in order to further improve the accuracy of individual position recognition, the present disclosure is realized through the above steps S2-S4.

In the step S2, according to the PIT tag information of the target fish school in the monitoring period, the 3D fish school trajectory map of the target fish school during the monitoring period is generated, which can be realized by inputting the PIT tag information into a 3D trajectory map generation software.

In an illustrated embodiment, the generating, according to the PIT tag information of the target fish school during the monitoring period, a 3D fish school trajectory map of the target fish school during the monitoring period includes: classifying the PIT tag information of the target fish school according to the PIT tag of the PIT tag information of each fish of the target fish school, to obtain PIT tag information groups of all fish of the target fish school; generating a 3D motion trajectory corresponding to each of the PIT tag information groups according the time stamp, the first longitude coordinate, the first latitude coordinate, and the first vertical depth, to thereby obtain 3D motion trajectories corresponding to the PIT tag information groups; dividing, according to the PIT tag of the PIT tag information of each fish of the target fish school, the target fish school into fish species, and obtaining 3D motion trajectories of the fish species of the target fish school; fitting the 3D motion trajectories of the fish species of the target fish school to generate fitted 3D motion trajectories of the fish species of the target fish school; and generating, according to the fitted 3D motion trajectories of the fish species of the target fish school and the 3D motion trajectories corresponding to the PIT tag information groups, the 3D fish school trajectory map of the target fish school during the monitoring period.

Specifically, because the PIT tag uniquely identifies an identity code of a fish corresponding to the PIT tag, all PIT tag information collected during the monitoring period can be classified through the PIT tags to obtain a PIT tag information group corresponding to each PIT tag. Each PIT tag information group contains the PIT tag information under all time stamps corresponding to the PIT tag. For each PIT tag information group, the first longitude coordinate, the first latitude coordinate and the first depth coordinate in the PIT tag information are taken as the 3D coordinates of the 3D spatial points of the 3D motion trajectory of the fish corresponding to the PIT tag. Multiple 3D spatial points are generated in the software, and then the 3D spatial points are connected according to a sequence of time recorded by the time stamps, that is, the 3D motion trajectory corresponding to the PIT tag is formed. After generating the 3D motion trajectory, a 3D coordinate of a 3D spatial point selected on the 3D motion trajectory is expressed by the second longitude coordinate, the second latitude coordinate and the second vertical depth. Further, the fish in the target fish school are divided according to the PIT markers, and a number of fish contained in the target fish school and 3D motion trajectories corresponding to each fish species are obtained. 3D motion trajectories belonging to a same fish species are fitted to obtain the fitted 3D motion trajectory of each fish species. According to the fitted 3D motion trajectories of the fish species of the target fish school and the 3D motion trajectories corresponding to the PIT tag information groups, the 3D fish school trajectory map of the target fish school during the monitoring period can be used to preliminarily analyze an activity trajectory, an activity range, a movement speed of each fish species and an activity trajectory, an activity range and a movement speed of each fish during the monitoring period.

In the step S3, the 3D motion trajectory generated according to the PIT tag information group of each fish can be further refined to make the 3D motion trajectory approach an actual motion trajectory of the fish. In the present disclosure, firstly, the 3D motion trajectory generated by the software is transformed into an expression form of a motion sequence, and then the motion sequence is corrected by a pre-trained motion trajectory correction model to obtain a corrected motion sequence.

In an illustrated embodiment, the generating, according to the 3D motion trajectory of each fish of the target fish school, a motion sequence of each fish of the target fish school includes: selecting 3D spatial points from the 3D motion trajectory of each fish of the target fish school to generate a 3D spatial point set, and recording a time stamp of each of the selected 3D spatial points, where the 3D spatial point set includes at least the multiple 3D spatial points generated by the PIT tag information, a starting point of the 3D motion trajectory and an ending point of the 3D motion trajectory; and generating the motion sequence according to the 3D spatial point set and a time stamp of each 3D spatial point in the 3D spatial point set.

For generating the motion sequence of each fish, it is necessary to select the 3D spatial points from the corresponding 3D motion trajectory of each fish to generate the 3D spatial point set. When taking 3D spatial points on the 3D motion trajectory, it is necessary to select reference points for generating the 3D motion trajectory, that is, the 3D spatial points with the same second longitude coordinates, second latitude coordinates and second vertical depth in the current 3D motion trajectory at a same time stamp as the first longitude coordinates, first latitude coordinates and first vertical depth in the PIT tag information, as well as a starting point and an ending point of the current 3D motion trajectory. In addition, in order to make the motion sequence data richer and the correction result better, in addition to the above-mentioned mandatory 3D points, multiple 3D points are randomly selected from the 3D motion trajectory and added to the 3D spatial point set. The motion sequence is generated according to the final 3D spatial point set and the time stamps corresponding to the 3D spatial points contained in the final 3D spatial point set. Illustratively, the motion sequence may be expressed as [(starting time stamp, 3D coordinate of starting point 3D spatial point), (time stamp 1, 3D coordinate of time stamp 1 3D spatial point), (time stamp 2, 3D coordinate of time stamp 2 3D spatial point), . . . , (end time stamp, 3D coordinate of ending point 3D spatial point)].

In an illustrated embodiment, a construction process of the motion trajectory correction model includes: obtaining historical motion sequence samples of multiple fish species, where each sample of the historical motion sequence samples includes multiple historical 3D coordinate samples with continuous time stamps; constructing an initial motion trajectory correction model, where the initial motion trajectory correction model includes a classification module and a trajectory correction module, the trajectory correction module includes trajectory correction sub-models, each of the trajectory correction sub-models corresponds to one fish species of the multiple fish species; training the classification module of the initial motion trajectory correction model with the historical motion sequence samples of the multiple fish species until the classification module reaches a first preset convergence condition, obtaining network parameters of the classification module in the first preset convergence condition, and freezing the network parameters of the classification module to obtain frozen network parameters of the classification module; training each of the trajectory correction sub-models with the historical motion sequence samples of the one fish species of the multiple fish species corresponding to each of the trajectory correction sub-models until the trajectory correction sub-model reaches a second preset convergence condition, obtaining network parameters of each of the trajectory correction sub-models in the second preset convergence condition, and freezing the network parameters of each of the trajectory correction sub-models to obtain frozen network parameters of each of the trajectory correction sub-models; and adjusting network parameters of the initial motion trajectory correction model according to the frozen network parameters of the classification module and the frozen network parameters of each of the trajectory correction sub-models, and generating the motion trajectory correction model.

Specifically, firstly, historical motion sequence samples of multiple fish species are obtained, and, each sample of the historical motion sequence samples includes multiple historical 3D coordinate samples with continuous time stamps. It should be noted that in order to make the motion trajectory correction model obtained by training realize the motion trajectory correction of all the fish species contained in the marine ranch, the historical motion sequence samples obtained here need to include the historical motion sequence samples of the existing fish species in the marine ranch and the known fish species to be exiled to the marine ranch.

Specifically, an initial motion trajectory correction model is constructed, the initial motion trajectory correction model includes a classification module and a trajectory correction module, the trajectory correction module includes trajectory correction sub-models, each of the trajectory correction sub-models corresponds to one fish species of the multiple fish species. For example, the historical motion sequence samples of five fish species are obtained at present, and the trajectory correction module includes five trajectory correction sub-models, and a number of trajectory correction sub-models corresponds to the number of fish species. The training of the initial motion trajectory correction model is divided into two steps, namely training of the classification module and training of the trajectory correction module. For the training of the classification module, the classification module is trained with each historical motion sequence sample as an input and the corresponding fish species as an output, so that the classification module can be trained to extract and learn the fish species characteristic information in each historical motion sequence sample, output prediction results according to the extracted fish species characteristic information, compare the prediction results with the fish species corresponding to the motion sequence sample to determine errors and calculate a loss function, and then adjust network parameters of the classification module according to the errors. Until the loss function of the classification module is minimum or reaches a maximum number of iterations (that is, when the first preset convergence condition is reached), the network parameters when the classification module reaches the first preset convergence condition are obtained and frozen.

In an embodiment, each of the classification module, the trajectory correction module, and the trajectory correction sub-models is embodied by at least one processor and at least one memory coupled to the at least one processor, and the at least one memory stores computer programs executable by the at least one processor.

For training each trajectory correction sub-model in the trajectory correction module, the historical motion sequence samples corresponding to each fish species are respectively input into the trajectory correction sub-model corresponding to the fish species for training. For example, data of a fish species a is input into a trajectory correction sub-model a, data of a fish species b is input into a trajectory correction sub-model b, . . . , and data of a fish species n is input into a trajectory correction sub-model n. By this way that one fish species corresponds to one trajectory correction sub-model, when introducing new fish species, we only need to add a new trajectory correction sub-model in the trajectory correction module and retrain the new trajectory correction sub-model and the classification module to improve the flexibility of the trajectory correction model. When a loss function of any trajectory correction sub-model is minimum or reaches the maximum iteration number (that is, when the second preset convergence condition is reached), the network parameters of the trajectory correction sub-model reaching the second preset convergence condition are obtained and frozen. For the remaining trajectory correction sub-models that still need to be trained, continue to train until they converge before freezing the network parameters. The network parameters of the initial motion trajectory correction model are generated according to the frozen network parameters of the classification module and the frozen network parameters of each of the trajectory correction sub-models to generate the motion trajectory correction model.

In an illustrated embodiment, the training each of the trajectory correction sub-models with the historical motion sequence samples of the one fish species of the multiple fish species corresponding to each of the trajectory correction sub-models includes: dividing, according to a time stamp sequence of the historical motion sequence samples, the historical motion sequence samples into multiple motion sequence sample fragments, where each of the multiple motion sequence sample fragments includes motion samples under three consecutive time stamps; and training each of the trajectory correction sub-models with the multiple motion sequence sample fragments, including: when the trajectory correction sub-model is trained with one motion sequence sample fragment of the multiple motion sequence sample fragments, repeatedly performing an operation of selecting a motion sample under one time stamp of the three consecutive time stamps as an output and selecting the motion samples under the remaining time stamps of the three consecutive time stamps as inputs to train the trajectory correction sub-model until all motion samples at each time stamp within the one motion sequence sample fragment have been selected as outputs, and then training the trajectory correction sub-model with a next motion sequence sample fragment of the multiple motion sequence sample fragments to the one motion sequence sample fragment.

Specifically, for training of each trajectory correction sub-model, according to the time stamp sequence of the historical motion sequence samples, the historical motion sequence samples are divided into multiple continuous sequence sample fragments. Each of the multiple motion sequence sample fragments includes motion samples under three consecutive time stamps. For example, if historical motion sequence samples corresponding to a current fish species A are [(time stamp a, coordinate A), (time stamp b, coordinate B), (time stamp c, coordinate C), (time stamp d, coordinate D), . . . , (time stamp n, coordinate N)], the obtained motion sequence sample fragments are exemplarily [(time stamp a, coordinate A), (time stamp b, coordinate B), (time stamp c, coordinate C)], [(time stamp b, coordinate B), (time stamp c, coordinate C), (time stamp d, coordinate D)].

A process for training each of the trajectory correction sub-models with the multiple motion sequence sample fragments includes: when the trajectory correction sub-model is trained with one motion sequence sample fragment of the multiple motion sequence sample fragments, for example, when training the trajectory correction sub-model with [(time stamp a, coordinate A), (time stamp b, coordinate B), (time stamp c, coordinate B)], (time stamp b, coordinate B) is selected as the output, and then (time stamp a, coordinate A) and (time stamp c, coordinate C) are selected as inputs to train the model to output the predicted coordinate B corresponding to the timestamp b according to (time stamp a, coordinate A) and (time stamp c, coordinate C). By adjusting the network parameters, the predicted coordinate B is close to the original coordinate B. After completing this round of training, the time stamp b is marked as the output, then (time stamp c, coordinate C) is selected as the output, (time stamp a, coordinate A) and (time stamp b, coordinate B) are selected as the inputs, to train the model to output the predicted coordinate C corresponding to the time stamp c according to (time stamp a, coordinate A) and (time stamp b, coordinate B). Similarly, (time stamp a, coordinate A) is selected as the output, and then (time stamp b, coordinate B) and (time stamp c, coordinate C) are selected as inputs to train the model to output the predicted coordinate A corresponding to the timestamp a according to (time stamp b, coordinate B) and (time stamp c, coordinate C). By adjusting the network parameters, the predicted coordinate A is close to the original coordinate A. After completing this round of training, the time stamp a has been taken as the output. At this time, the training and learning of the correlation between timestamps of this motion sequence sample fragment are completed, and the training and learning of a next motion sequence sample fragment is continued. The steps are the same as those in the above example, which are not repeated herein. After training each trajectory correction sub-model in this way, the trajectory correction sub-model has the coordinate information corresponding to a vacancy timestamp predicted according to the adjacent or interval timestamp, and then when the motion sequence lacking fine data is input into the trained trajectory correction sub-model, the motion sequence data can be finely filled, so that the obtained corrected motion sequence is smoother and has richer three-dimensional space point data.

For the step S4, in an illustrated embodiment, the generating, according to the corrected motion sequences of all fish of the target fish school, a first corrected 3D fish school trajectory map of the target fish school during the monitoring period, and generating a second corrected 3D fish school trajectory map according to the first corrected 3D fish school trajectory map and the 3D fish school trajectory map includes: generating, according to the corrected motion sequence of each fish of the target fish school, a corrected 3D motion trajectory of each fish of the target fish school to thereby obtain corrected 3D motion trajectories of all fish of the target fish school; fitting corrected 3D motion trajectories belonging to a same fish species of the corrected 3D trajectories of all fish of the target fish school according to the PIT tag of each fish of the target fish school to obtain fitted corrected 3D motion trajectories of the fish species of the target fish school; generating, according to the fitted corrected 3D motion trajectories of the fish species of the target fish school and the corrected 3D motion trajectories of all fish of the target fish school, the first corrected 3D fish school trajectory map; constructing, according to the first corrected 3D fish school trajectory map, a geometric spatial body corresponding to a movement area of the target fish school during the monitoring period; establishing a spatial cartesian coordinate system by taking a geometric center of the geometric spatial body as a coordinate origin, converting each 3D spatial point in the first corrected 3D fish school trajectory map into a 3D coordinate corresponding to the spatial cartesian coordinate system to thereby generate a third corrected 3D fish school trajectory map; projecting the third corrected 3D fish school trajectory map onto the spatial cartesian coordinate system to obtain a first projection of the third corrected 3D fish school trajectory map on a horizontal plane in the spatial cartesian coordinate system, a second projection of the third corrected 3D fish school trajectory map on a vertical plane in the spatial cartesian coordinate system, and a third projection of the third corrected 3D fish school trajectory map on a lateral plane in the spatial cartesian coordinate system; converting each 3D spatial point in the 3D fish school trajectory map into a 3D coordinate corresponding to the spatial cartesian coordinate system to thereby generate a to-be-corrected 3D fish school trajectory map; projecting the to-be-corrected 3D fish school trajectory map onto the spatial cartesian coordinate system to obtain a fourth projection of the to-be-corrected 3D fish school trajectory map on the horizontal plane in the spatial cartesian coordinate system, a fifth projection of the to-be-corrected 3D fish school trajectory map on the vertical plane in the spatial cartesian coordinate system, and a sixth projection of the to-be-corrected 3D fish school trajectory map on the lateral plane in the spatial cartesian coordinate system; and correcting the fourth projection according to the first projection, correcting the fifth projection according to the second projection, and correcting the sixth projection according to the third projection, to thereby generate the second corrected 3D fish school trajectory map.

Specifically, after each corrected motion sequence is obtained, a corrected 3D motion trajectory of each fish of the target fish school is generated according to the corrected motion sequence of each fish of the target fish school, which can also be generated by software. corrected 3D motion trajectories belonging to a same fish species of the corrected 3D trajectories of all fish of the target fish school are fitted according to the PIT tag of each fish of the target fish school to obtain fitted corrected 3D motion trajectories of the fish species of the target fish school; and the first corrected 3D fish school trajectory map is generated according to the fitted corrected 3D motion trajectories of the fish species of the target fish school and the corrected 3D motion trajectories of all fish of the target fish school. After determining the first corrected 3D fish school trajectory map, a geometric spatial body corresponding to a movement area of a target fish school during the monitoring period is constructed based on the first corrected 3D fish school trajectory map. The geometric spatial body needs to completely wrap all the trajectory curves in the first corrected 3D fish school trajectory map. In an embodiment, the geometric spatial body can be a cubic structure, so as to obtain a geometric center of the geometric spatial body. After determining the geometric center of the geometric spatial body, the geometric center is taken as a coordinate origin, the spatial cartesian coordinate system spatial cartesian coordinate system is established, and the coordinates of each 3D spatial point in the first corrected 3D fish school trajectory map are converted from the latitude and longitude and depth representations to the 3D coordinate representation corresponding to the spatial cartesian coordinate system. The conversion method therefor can be realized based on the existing way of converting latitude and longitude coordinates into two-dimensional plane coordinates, and a deviation in the vertical direction is smaller, which can be ignored in the conversion. A third corrected 3D fish school trajectory map is generated according to the transformed 3D coordinates, and the third corrected 3D fish school trajectory map is projected in the spatial cartesian coordinate system to obtain the first projection of the third corrected 3D fish school trajectory map on the horizontal plane in the spatial cartesian coordinate system, the second projection of the third corrected 3D fish school trajectory map on the vertical plane in the spatial cartesian coordinate system and the third projection of the third corrected 3D fish school trajectory map on the lateral plane in the spatial cartesian coordinate system. Similarly, the same conversion operation is performed on the 3D fish school trajectory map to generate the to-be-corrected 3D fish school trajectory map. The to-be-corrected 3D fish school trajectory map is projected onto the spatial cartesian coordinate system to obtain a fourth projection of the to-be-corrected 3D fish school trajectory map on the horizontal plane in the spatial cartesian coordinate system, a fifth projection of the to-be-corrected 3D fish school trajectory map on the vertical plane in the spatial cartesian coordinate system, and a sixth projection of the to-be-corrected 3D fish school trajectory map on the lateral plane in the spatial cartesian coordinate system. The fourth projection is corrected according to the first projection, the fifth projection is corrected according to the second projection, and the sixth projection is corrected according to the third projection, to thereby generate the second corrected 3D fish school trajectory map.

In an illustrated embodiment, after the constructing, according to the first corrected 3D fish school trajectory map, a geometric spatial body corresponding to a movement area of the target fish school during the monitoring period, the PIT-based fish school trajectory monitoring method for the marine ranch further includes: obtaining coordinate information of a marine ecological red line, and determining a two-dimensional (2D) section model of the marine ecological red line according to the coordinate information of the marine ecological red line; in response to the geometric space corresponding to the movement area of the target fish school during the monitoring period being interspersed with the 2D section model of the marine ecological red line, determining time stamps corresponding to corrected 3D fish school trajectory map segments within the marine ecological red line; obtaining 3D fish school trajectory map segments according to time stamps corresponding to corrected 3D fish school trajectory map segments within the marine ecological red line, obtaining 3D coordinates of 3D spatial points in the 3D fish school trajectory map segments, and converting the 3D coordinates of 3D spatial points in the 3D fish school trajectory map segments into 3D coordinates corresponding to the spatial cartesian coordinate system to thereby generate a fourth corrected 3D fish school trajectory map; and projecting the fourth corrected 3D fish school trajectory map onto the spatial cartesian coordinate system to obtain a seventh projection of the fourth corrected 3D fish school trajectory map on the horizontal plane in the spatial cartesian coordinate system, an eighth projection of the fourth corrected 3D fish school trajectory map on the vertical plane in the spatial cartesian coordinate system, and a ninth projection of the fourth corrected 3D fish school trajectory map on the lateral plane in the spatial cartesian coordinate system; where the correcting the fourth projection according to the first projection, correcting the fifth projection according to the second projection, and correcting the sixth projection according to the third projection, to thereby generate the second corrected 3D fish school trajectory map includes: correcting the fourth projection according to the first projection and the seventh projection, correcting the fifth projection according to the second projection and the eighth projection, and correcting the sixth projection according to the third projection and the ninth projection, to thereby generate the second corrected 3D fish school trajectory map.

Specifically, it should be noted that the marine ecological red line refers to a boundary line that divides important marine ecological functional areas, ecologically sensitive areas and ecologically fragile areas into key control areas in order to maintain marine ecological health and ecological security. Therefore, it is necessary to consider the key monitoring of the fish school in the marine ecological red line when monitoring the target fish school. Firstly, the coordinate information of marine ecological red line is obtained, and the 2D section model of marine ecological red line is determined according to the coordinate information of the marine ecological red line. When the geometric space corresponding to the movement area of the target fish school during the monitoring period is interspersed with the 2D section model of the marine ecological red line, that is, the movement area of the target fish school during the monitoring period involves a control area corresponding to the marine ecological red line, at this time, the time stamps corresponding to the corrected 3D fish school trajectory map segments within the marine ecological red line should be determined according to the marine ecological red line. Then, the following steps are performed: obtaining 3D fish school trajectory map segments according to time stamps corresponding to corrected 3D fish school trajectory map segments within the marine ecological red line, obtaining 3D coordinates of 3D spatial points in the 3D fish school trajectory map segments, and converting the 3D coordinates of 3D spatial points in the 3D fish school trajectory map segments into 3D coordinates corresponding to the spatial cartesian coordinate system to thereby generate a fourth corrected 3D fish school trajectory map; and projecting the fourth corrected 3D fish school trajectory map onto the spatial cartesian coordinate system to obtain a seventh projection of the fourth corrected 3D fish school trajectory map on the horizontal plane in the spatial cartesian coordinate system, an eighth projection of the fourth corrected 3D fish school trajectory map on the vertical plane in the spatial cartesian coordinate system, and a ninth projection of the fourth corrected 3D fish school trajectory map on the lateral plane in the spatial cartesian coordinate system. Then, the fourth corrected 3D fish school trajectory map is projected in the spatial cartesian coordinate system and the first corrected 3D fish school trajectory map is used to correct the 3D fish school trajectory map to generate the second corrected 3D fish school trajectory map.

In the step S5, the motion information of the target fish school is generated according to the second corrected 3D fish school trajectory map, which may include a migration direction of the target fish school (that is, the motion direction of the target fish school is determined according to the latest time stamp of the second corrected 3D fish school trajectory map), and the motion speed of the fish school between time intervals of the time stamps during the monitoring period. The information is fed back to the monitoring personnel, who can study the movement habit and the movement area of the target fish school during the monitoring period according to the second corrected 3D fish school trajectory map, and then infer the data such as water resources content corresponding to the movement area, so as to provide more accurate and rich data support for the monitoring personnel to study the biology of the target fish school.

In an embodiment, the PIT-based fish school trajectory monitoring method for the marine ranch further includes: sending the second corrected 3D fish school trajectory map, the migration direction of the target fish school, and the movement speed of the target fish school during the monitoring period to a controller of a fishing device, the fishing device including the controller, a fishing net, and an actuator connected to the controller and the fishing net; and controlling by the controller, based on the second corrected 3D fish school trajectory map, the migration direction of the target fish school, and the movement speed of the target fish school during the monitoring period, the actuator to drive the fishing net to reach a target position to catch the target fish school.

In an embodiment, each of the classification module and the trajectory correction module is embodied by at least one processor and at least one memory coupled to the at least one processor, and the at least one memory stores computer programs executable by the at least one processor.

On the basis of the above method embodiments, the present disclosure correspondingly provides system embodiments.

Figure 2:
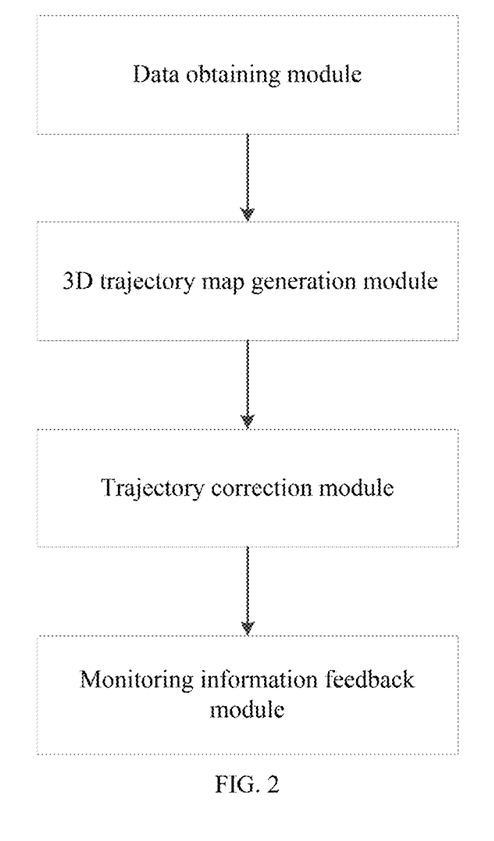
FIG. 2 illustrates a schematic structural diagram of a PIT-based fish school trajectory monitoring system for a marine ranch.

As illustrated in FIG. 2, an embodiment of the present disclosure provides a PIT-based fish school trajectory monitoring system for a marine ranch, which includes a data obtaining module, a 3D trajectory map generation module, a trajectory correction module, and a monitoring information feedback module.

The data obtaining module is configured to: use a PIT reader to obtain PIT tag information of each fish of a target fish school during a monitoring period to thereby obtain PIT tag information of the target fish school during the monitoring period, where each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school includes: a PIT tag, a time stamp, a first longitude coordinate, a first latitude coordinate and a first vertical depth.

The 3D trajectory map generation module is configured to: generate, according to the PIT tag information of the target fish school during the monitoring period, a 3D fish school trajectory map of the target fish school during the monitoring period, where the 3D fish school trajectory map consists of 3D motion trajectories of all fish in the target fish school, a 3D motion trajectory of each fish of the target fish school includes multiple 3D spatial points, a 3D coordinate of each of the multiple 3D spatial points includes: a second longitude coordinate, a second latitude coordinate, and a second vertical depth.

The trajectory correction module is configured to: generate, according to the 3D motion trajectory of each fish of the target fish school, a motion sequence of each fish of the target fish school, input the motion sequence of each fish of the target fish school into a motion trajectory correction model, output, by the motion trajectory correction model, a corrected motion sequence of each fish of the target fish school to thereby obtain corrected motion sequences of all fish of the target fish school, generate, according to the corrected motion sequences of all fish of the target fish school, a first corrected 3D fish school trajectory map of the target fish school during the monitoring period, and generate a second corrected 3D fish school trajectory map according to the first corrected 3D fish school trajectory map and the 3D fish school trajectory map.

The monitoring information feedback module is configured to: generate motion information of the target fish school according to the second corrected 3D fish school trajectory map, and feedback the second corrected 3D fish school trajectory map and the motion information of the target fish school to a monitoring personnel, where the motion information of the target fish school includes: a migration direction of the target fish school, and a movement speed of the target fish school during the monitoring period.

In an embodiment, each of the data obtaining module, the 3D trajectory map generation module, the trajectory correction module, and the monitoring information feedback module is embodied by at least one processor and at least one memory coupled to the at least one processor, and the at least one memory stores computer programs executable by the at least one processor.

It should be noted that the system embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of this embodiment. In addition, in the figure of the system embodiment provided by the present disclosure, the connection relationship between modules indicates that they have communication connection, which can be realized as one or more communication buses or signal lines. Ordinary technicians in this field can understand and implement it without creative labor.

Those skilled in the art can clearly understand that for convenience and conciseness, the specific working process of the system described above can refer to the corresponding process in the aforementioned method embodiment, and will not be described herein again.

On the basis of the above-mentioned method embodiments, the present disclosure correspondingly provides a terminal device embodiment.

An embodiment of the present disclosure provides a terminal device, which includes a processor, a memory and a computer program stored in the memory. The computer program, when executed by the processor, is configured to implement the PIT-based fish school trajectory monitoring method for the marine ranch described above.

The terminal device can be a computing device such as a desktop computer, a notebook, a palmtop computer and a cloud server. The terminal device may include, but is not limited to, a processor and a memory.

The processor can be a central processing unit (CPU), other general processor, a digital signal processor (DSP), an application specific integrated circuit (ASIC), a field-programmable gate array (FPGA) or other programmable logic device, a discrete gate or transistor logic device, or a discrete hardware component. The general processor can be a microprocessor or any conventional processor. The processor is a control center of the terminal device and connects all parts of the whole terminal device with various interfaces and circuits.

The memory can be used to store the computer program, and the processor realizes various functions of the terminal device by running or executing the computer program stored in the memory and calling data stored in the memory. The memory may mainly include a storage program area and a storage data area. The storage program area may store an operating system, an application program required by at least one function, and the like. The data storage area can store data created according to the use of a mobile phone. In addition, the memory may include a high-speed random-access memory and a non-volatile memory, such as a hard disk, a memory, a plug-in hard disk, a smart media card (SMC), a secure digital (SD) card, a flash card, at least one disk memory device, a flash memory device, or other volatile solid-state memory devices.

On the basis of the above method embodiments, the present disclosure correspondingly provides a storage medium embodiment.

An embodiment of the disclosure provides a storage medium, which includes a computer program stored in the storage medium. The computer program, when executed by a device on which the storage medium is located, is configured to control the device to implement the PIT-based fish school trajectory monitoring method for the marine ranch described above. Specifically, the storage medium is a non-transitory storage medium.

The storage medium is a computer-readable storage medium (i.e., non-transitory computer-readable storage medium), and the computer program is stored in the computer-readable storage medium, which, when executed by a processor, can realize the steps of the above method embodiments. The computer program includes computer program codes, which can be in a source code form, an object code form, an executable file form or some intermediate form. The computer-readable storage medium may include any entity or device capable of carrying the computer program codes, a recording medium, an U disk, mobile hard disk, a magnetic disk, an optical disk, a computer memory, a read-only memory (ROM), a random access memory (RAM), an electric carrier signal, telecommunication signal, a software distribution medium.

The above are the exemplified embodiments of the present disclosure, and it should be pointed out that a person skilled in the art can make several improvements and embellishments without departing from the principle of the present disclosure, and these improvements and embellishments are also regarded as the scope of protection of the present disclosure.

What is claimed is:

1. A passive integrated transponder (PIT)-based fish school trajectory monitoring method for a marine ranch, comprising:

using a PIT reader to obtain PIT tag information of each fish of a target fish school during a monitoring period to thereby obtain PIT tag information of the target fish school during the monitoring period, wherein each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school comprises: a PIT tag, a time stamp, a first longitude coordinate, a first latitude coordinate and a first vertical depth;

generating, according to the PIT tag information of the target fish school during the monitoring period, a three-dimensional (3D) fish school trajectory map of the target fish school during the monitoring period, wherein the 3D fish school trajectory map consists of 3D motion trajectories of all fish in the target fish school, a 3D motion trajectory of each fish of the target fish school comprises multiple 3D spatial points, and a 3D coordinate of each of the multiple 3D spatial points comprises: a second longitude coordinate, a second latitude coordinate, and a second vertical depth;

generating, according to the 3D motion trajectory of each fish of the target fish school, a motion sequence of each fish of the target fish school, inputting the motion sequence of each fish of the target fish school into a motion trajectory correction model, and outputting, by the motion trajectory correction model, a corrected motion sequence of each fish of the target fish school to thereby obtain corrected motion sequences of all fish of the target fish school;

generating, according to the corrected motion sequences of all fish of the target fish school, a first corrected 3D fish school trajectory map of the target fish school during the monitoring period, and generating a second corrected 3D fish school trajectory map according to the first corrected 3D fish school trajectory map and the 3D fish school trajectory map; and generating motion information of the target fish school according to the second corrected 3D fish school trajectory map, and feeding back the second corrected 3D fish school trajectory map and the motion information of the target fish school to a monitoring personnel, wherein the motion information of the target fish school comprises: a migration direction of the target fish school, and a movement speed of the target fish school during the monitoring period;

wherein a construction process of the motion trajectory correction model comprises:

obtaining historical motion sequence samples of multiple fish species, wherein each sample of the historical motion sequence samples comprises multiple historical 3D coordinate samples with continuous time stamps;

constructing an initial motion trajectory correction model, wherein the initial motion trajectory correction model comprises a classification module and a trajectory correction module, the trajectory correction module comprises trajectory correction sub-models, each of the trajectory correction sub-models corresponds to one fish species of the multiple fish species;

training the classification module of the initial motion trajectory correction model with the historical motion sequence samples of the multiple fish species until the classification module reaches a first preset convergence condition, obtaining network parameters of the classification module in the first preset convergence condition, and freezing the network parameters of the classification module to obtain frozen network parameters of the classification module;

training each of the trajectory correction sub-models with the historical motion sequence samples of the one fish species of the multiple fish species corresponding to each of the trajectory correction sub-models until the trajectory correction sub-model reaches a second preset convergence condition, obtaining network parameters of each of the trajectory correction sub-models in the second preset convergence condition, and freezing the network parameters of each of the trajectory correction sub-models to obtain frozen network parameters of each of the trajectory correction sub-models; and adjusting network parameters of the initial motion trajectory correction model according to the frozen network parameters of the classification module and the frozen network parameters of each of the trajectory correction sub-models, and generating the motion trajectory correction model; and wherein the generating, according to the PIT tag information of the target fish school during the monitoring period, a 3D fish school trajectory map of the target fish school during the monitoring period comprises:

classifying the PIT tag information of the target fish school according to the PIT tag of the PIT tag information of each fish of the target fish school, to obtain PIT tag information groups of all fish of the target fish school;

generating a 3D motion trajectory corresponding to each of the PIT tag information groups according the time stamp, the first longitude coordinate, the first latitude coordinate, and the first vertical depth, to thereby obtain 3D motion trajectories corresponding to the PIT tag information groups;

dividing, according to the PIT tag of the PIT tag information of each fish of the target fish school, the target fish school into fish species, and obtaining 3D motion trajectories of the fish species of the target fish school;

fitting the 3D motion trajectories of the fish species of the target fish school to generate fitted 3D motion trajectories of the fish species of the target fish school; and generating, according to the fitted 3D motion trajectories of the fish species of the target fish school and the 3D motion trajectories corresponding to the PIT tag information groups, the 3D fish school trajectory map of the target fish school during the monitoring period.

2. The PIT-based fish school trajectory monitoring method for the marine ranch as claimed in claim 1, wherein the training each of the trajectory correction sub-models with the historical motion sequence samples of the one fish species of the multiple fish species corresponding to each of the trajectory correction sub-models comprises:

dividing, according to a time stamp sequence of the historical motion sequence samples, the historical motion sequence samples into multiple motion sequence sample fragments, wherein each of the multiple motion sequence sample fragments comprises motion samples under three consecutive time stamps; and training each of the trajectory correction sub-models with the multiple motion sequence sample fragments, comprising: when the trajectory correction sub-model is trained with one motion sequence sample fragment of the multiple motion sequence sample fragments, repeatedly performing an operation of selecting a motion sample under one time stamp of the three consecutive time stamps as an output and selecting the motion samples under the remaining time stamps of the three consecutive time stamps as inputs to train the trajectory correction sub-model until all motion samples at each time stamp within the one motion sequence sample fragment have been selected as outputs, and then training the trajectory correction sub-model with a next motion sequence sample fragment of the multiple motion sequence sample fragments to the one motion sequence sample fragment.

3. The PIT-based fish school trajectory monitoring method for the marine ranch as claimed in claim 1, wherein the generating, according to the 3D motion trajectory of each fish of the target fish school, a motion sequence of each fish of the target fish school comprises:

selecting 3D spatial points from the 3D motion trajectory of each fish of the target fish school to generate a 3D spatial point set, and recording a time stamp of each of the selected 3D spatial points, wherein the 3D spatial point set comprises at least the multiple 3D spatial points generated by the PIT tag information, a starting point of the 3D motion trajectory and an ending point of the 3D motion trajectory; and generating the motion sequence according to the 3D spatial point set and a time stamp of each 3D spatial point in the 3D spatial point set.

4. The PIT-based fish school trajectory monitoring method for the marine ranch as claimed in claim 3, wherein the generating, according to the corrected motion sequences of all fish of the target fish school, a first corrected 3D fish school trajectory map of the target fish school during the monitoring period, and generating a second corrected 3D fish school trajectory map according to the first corrected 3D fish school trajectory map and the 3D fish school trajectory map comprises:

generating, according to the corrected motion sequence of each fish of the target fish school, a corrected 3D motion trajectory of each fish of the target fish school to thereby obtain corrected 3D motion trajectories of all fish of the target fish school;

fitting corrected 3D motion trajectories belonging to a same fish species of the corrected 3D trajectories of all fish of the target fish school according to the PIT tag of each fish of the target fish school to obtain fitted corrected 3D motion trajectories of the fish species of the target fish school;

generating, according to the fitted corrected 3D motion trajectories of the fish species of the target fish school and the corrected 3D motion trajectories of all fish of the target fish school, the first corrected 3D fish school trajectory map;

constructing, according to the first corrected 3D fish school trajectory map, a geometric spatial body corresponding to a movement area of the target fish school during the monitoring period;

establishing a spatial cartesian coordinate system by taking a geometric center of the geometric spatial body as a coordinate origin, converting each 3D spatial point in the first corrected 3D fish school trajectory map into a 3D coordinate corresponding to the spatial cartesian coordinate system to thereby generate a third corrected 3D fish school trajectory map;

projecting the third corrected 3D fish school trajectory map onto the spatial cartesian coordinate system to obtain a first projection of the third corrected 3D fish school trajectory map on a horizontal plane in the spatial cartesian coordinate system, a second projection of the third corrected 3D fish school trajectory map on a vertical plane in the spatial cartesian coordinate system, and a third projection of the third corrected 3D fish school trajectory map on a lateral plane in the spatial cartesian coordinate system;

converting each 3D spatial point in the 3D fish school trajectory map into a 3D coordinate corresponding to the spatial cartesian coordinate system to thereby generate a to-be-corrected 3D fish school trajectory map;

projecting the to-be-corrected 3D fish school trajectory map onto the spatial cartesian coordinate system to obtain a fourth projection of the to-be-corrected 3D fish school trajectory map on the horizontal plane in the spatial cartesian coordinate system, a fifth projection of the to-be-corrected 3D fish school trajectory map on the vertical plane in the spatial cartesian coordinate system, and a sixth projection of the to-be-corrected 3D fish school trajectory map on the lateral plane in the spatial cartesian coordinate system; and correcting the fourth projection according to the first projection, correcting the fifth projection according to the second projection, and correcting the sixth projection according to the third projection, to thereby generate the second corrected 3D fish school trajectory map.

5. The PIT-based fish school trajectory monitoring method for the marine ranch as claimed in claim 4, wherein after the constructing, according to the first corrected 3D fish school trajectory map, a geometric spatial body corresponding to a movement area of the target fish school during the monitoring period, the PIT-based fish school trajectory monitoring method for the marine ranch further comprises:

obtaining coordinate information of a marine ecological red line, and determining a two-dimensional (2D) section model of the marine ecological red line according to the coordinate information of the marine ecological red line;

in response to the geometric space corresponding to the movement area of the target fish school during the monitoring period being interspersed with the 2D section model of the marine ecological red line, determining time stamps corresponding to corrected 3D fish school trajectory map segments within the marine ecological red line;

obtaining 3D fish school trajectory map segments according to time stamps corresponding to corrected 3D fish school trajectory map segments within the marine ecological red line, obtaining 3D coordinates of 3D spatial points in the 3D fish school trajectory map segments, and converting the 3D coordinates of 3D spatial points in the 3D fish school trajectory map segments into 3D coordinates corresponding to the spatial cartesian coordinate system to thereby generate a fourth corrected 3D fish school trajectory map; and projecting the fourth corrected 3D fish school trajectory map onto the spatial cartesian coordinate system to obtain a seventh projection of the fourth corrected 3D fish school trajectory map on the horizontal plane in the spatial cartesian coordinate system, an eighth projection of the fourth corrected 3D fish school trajectory map on the vertical plane in the spatial cartesian coordinate system, and a ninth projection of the fourth corrected 3D fish school trajectory map on the lateral plane in the spatial cartesian coordinate system;

wherein the correcting the fourth projection according to the first projection, correcting the fifth projection according to the second projection, and correcting the sixth projection according to the third projection, to thereby generate the second corrected 3D fish school trajectory map comprises:

correcting the fourth projection according to the first projection and the seventh projection, correcting the fifth projection according to the second projection and the eighth projection, and correcting the sixth projection according to the third projection and the ninth projection, to thereby generate the second corrected 3D fish school trajectory map.

6. A PIT-based fish school trajectory monitoring system for a marine ranch, wherein the PIT-based fish school trajectory monitoring system for the marine ranch is configured to implement the PIT-based fish school trajectory monitoring method for the marine ranch as claimed in claim 1, and the PIT-based fish school trajectory monitoring system for the marine ranch comprises: a data obtaining module, a 3D trajectory map generation module, a trajectory correction module, and a monitoring information feedback module;

wherein the data obtaining module is configured to: use a PIT reader to obtain PIT tag information of each fish of a target fish school during a monitoring period to thereby obtain PIT tag information of the target fish school during the monitoring period, wherein each fish of the target fish school is implanted with a PIT before monitoring, the PIT reader is configured to: in response to the fish implanted with the PIT passing through the PIT reader, identify the PIT and generate the PIT tag information of the fish implanted with the PIT, and the PIT tag information of each fish of the target fish school comprises: a PIT tag, a time stamp, a first longitude coordinate, a first latitude coordinate and a first vertical depth;

wherein the 3D trajectory map generation module is configured to: generate, according to the PIT tag information of the target fish school during the monitoring period, a 3D fish school trajectory map of the target fish school during the monitoring period, wherein the 3D fish school trajectory map consists of 3D motion trajectories of all fish in the target fish school, a 3D motion trajectory of each fish of the target fish school comprises multiple 3D spatial points, a 3D coordinate of each of the multiple 3D spatial points comprises: a second longitude coordinate, a second latitude coordinate, and a second vertical depth;

wherein the trajectory correction module is configured to: generate, according to the 3D motion trajectory of each fish of the target fish school, a motion sequence of each fish of the target fish school, input the motion sequence of each fish of the target fish school into a motion trajectory correction model, output, by the motion trajectory correction model, a corrected motion sequence of each fish of the target fish school to thereby obtain corrected motion sequences of all fish of the target fish school, generate, according to the corrected motion sequences of all fish of the target fish school, a first corrected 3D fish school trajectory map of the target fish school during the monitoring period, and generate a second corrected 3D fish school trajectory map according to the first corrected 3D fish school trajectory map and the 3D fish school trajectory map; and wherein the monitoring information feedback module is configured to: generate motion information of the target fish school according to the second corrected 3D fish school trajectory map, and feedback the second corrected 3D fish school trajectory map and the motion information of the target fish school to a monitoring personnel, wherein the motion information of the target fish school comprises: a migration direction of the target fish school, and a movement speed of the target fish school during the monitoring period.

7. A terminal device, comprising a processor, a memory, and a computer program stored in the memory and configured to be executed by the processor, wherein the computer program, when executed by the processor, is configured to implement the PIT-based fish school trajectory monitoring method for the marine ranch as claimed in claim 1.

8. A non-transitory computer readable storage medium, comprising a computer program stored in the non-transitory computer readable storage medium, wherein the computer program, when executed by a processing device on which the storage medium is located, is configured to control the processing device to implement the PIT-based fish school trajectory monitoring method for the marine ranch as claimed in claim 1.

* * * * *